United States Patent Office 3,231,018
Patented Jan. 25, 1966

3,231,018
ASSISTED RECOVERY BY SOLVENT FLOODING
Lyman L. Handy, Fullerton, Calif., assignor to Chevron Research Company, a corporation of Delaware
Filed May 22, 1962, Ser. No. 196,645
13 Claims. (Cl. 166—9)

This invention relates to the assisted recovery of petroleum from subterranean petroleum-bearing formations, and more particularly this invention relates to improved methods of solvent flooding a petroleum reservoir to assist in recovering petroleum therefrom.

In most oil-bearing formations, oil is first recovered by making use of natural formation pressure to move the oil towards producing wells from where it may be lifted to the surface. After the natural formation pressure has been depleted so it is no longer effective in producing oil, various secondary recovery methods are utilized. It is in this general area that the method of the present invention is concerned, although it is preferred to use the term "assisted recovery" which, while including secondary recovery as known in the art, is not limited to secondary recovery, but may also include primary or third, fourth, fifth, etc. development of the formation.

Prior art methods of assisted recovery by solvent flooding include miscible flooding and inert gas-solvent flooding. Miscible flooding, as the term is used in the art, refers to a secondary recovery process in which a solvent is injected into an oil-bearing formation and moved through the formation by a driving gas. The formation is maintained at a pressure in excess of the critical pressure of the solvent and gas at formation temperature. The formation pressure is adjusted and maintained at a pressure at which complete miscibility between the gas and the solvent is obtained. In other words only one phase of solvent and gas exists in the formation.

Inert gas-solvent flooding as the term is understood by those skilled in the art, refers to a process of recovering oil from a formation having a pressure about equal to the vapor pressure of an injected solvent at formation temperature. The method is discussed in "A Field Test of the Gas-Driven Liquid Propane Method of Oil Recovery" by L. H. Jenks et al. in the Transactions AIME (1957) 210 page 34. As there discussed, a formation was flooded with a solvent and a gas. The formation pressure was maintained at a value just above the vapor pressure of the solvent in the formation. This caused the solvent to be moved through the formation partly as a gas and partly as a liquid. The process was expected to be limited to formations in which the pressure could be maintained at a value just above the vapor pressure of the injected solvent. The amount of gas required to move the solvent through the formation rapidly increased as the pressure of the formation was increased above the solvent vapor pressure. Therefore the process was limited to use in formations which could be maintained at a pressure close to the vapor pressure of one of the available solvents at the formation temperature.

However, it has been discovered that the amount of gas required to move the solvent through the formation in two-phase relationship with the driving gas does not continue to increase as the pressure is increased above the vapor pressure of the solvent in the formation. The gas requirement does increase rapidly as the pressure in the formation is increased above the vapor pressure of the solvent up to a determinable pressure. However, it has been found that as the pressure of the formation is increased above this determinable value but not above the critical pressure for the solvent and gas at formation temperature, the gas required to move the solvent through the formation in two-phase relationship with the gas rapidly decreases. It has also been found that the success of a two-phase solvent and gas flood is dependent upon controlling the linear rate of advance of the two-phase solvent and gas bank in the formation within limits. The method of initially establishing the two-phase bank in the formation has also been found to be important to maximizing oil recovery from the formation.

It is, therefore, a principal object of this invention to provide a method of assisting the recovery of petroleum from petroleum-bearing formations by injecting solvent and gas through an injection well to establish a two-phase solvent bank in the formation, controlling the pressure on said formation to within predetermined limits, injecting additional gas into said formation to move said solvent in two-phase relationship with said gas through said formation at a controlled linear rate of advance of said two-phase bank and to produce the effluent resulting therefrom at a producing well.

In one aspect the present invention provides for injecting a solvent into an oil-bearing formation. A solvent is a substance which is miscible in all proportions with the petroleum in the formation. The solvent is injected into the formation through an injection well. The amount of solvent injected is only a fraction of the hydrocarbon pore volume of the formation.

A driving gas is injected into the formation through the injection well to move the solvent through the formation. The method of the invention provides for closely controlling the pressure on the solvent and the gas as they move through the formation. The pressure is controlled to cause two separate phases of solvent and gas to exist in the formation. The pressure is closely controlled to provide a bank comprising a gaseous phase of solvent and gas and a liquid phase of solvent and gas. The two-phase zone is progressively moved through the formation and the products of the assisted recovery drive are recovered from a production well. It has been found that by closely regulating the pressure at which the solvent and gas contact the formation oil, excessive solvent fingering and subsequent solvent break-through in the formation is prevented. The pressure limits are dependent on the particular solvent and gas which are injected into the formation and the temperature of the formation.

The method of the present invention requires that the pressure on the gas and solvent in the formation be maintained within limits. The lower limit of formation pressure is the vapor pressure of the particular solvent at formation temperature. This pressure will vary depending on the solvent utilized and on the temperature existing in the formation. One skilled in the art, however, can determine the vapor pressure of a solvent at the formation temperature. The upper limit of formation pressure is the highest pressure at which two phases of solvent and gas will exist at formation temperature. This pressure, which is known in the art as the critical pressure, can be determined by one skilled in the art given the properties of the solvent and the gas and temperature of the formation. The advantages of two-phase solvent flooding by the method of the present invention cannot be obtained unless the formation pressure is maintained at a value which does not exceed the critical pressure for the solvent and gas at formation temperature.

There are many advantages associated with solvent flooding according to the method of the present invention. Included among these advantages are the reduced solvent fingering that occurs when the solvent is moved through the formation in both liquid and gaseous phases. It has been discovered that there are very narrow pressure limits within the broad range indicated above where especially desirable results can be obtained by the method of the invention. These narrower pressure ranges are again dependent on the properties of the solvent and the gas at formation temperature. When a solvent flood is accomplished within the highly preferred limits it has been found that the producing gas and oil ratio at the producing well is kept to a minimum. However, many advantages over the prior art methods are available when the pressure on the solvent and the gas in the formation is maintained between the vapor pressure of the solvent and the highest pressure at which two phases of solvent and gas will exist in the formation and the linear rate of the two-phase solvent and gas bank is maintained with the preferred limits.

Further objects and advantages of the present invention will become apparent from the following detailed description and the accompanying drawings which are a part of the present specification.

Figure 1:
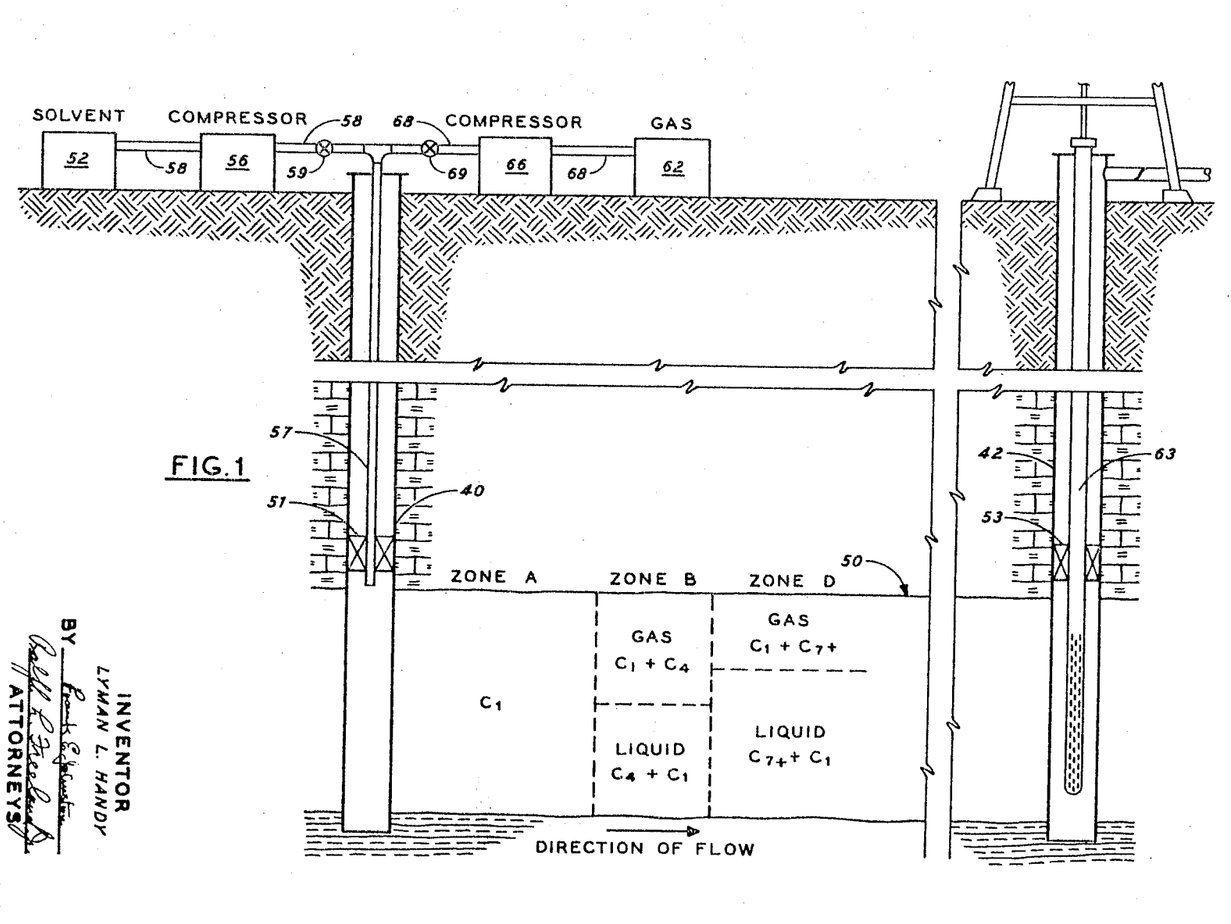
FIG. 1 is a vertical section of an oil-bearing formation illustrating the fluid saturations assumed in a solvent flood by the method of the present invention.

Referring now specifically to FIG. 1, a vertical section of an oil-bearing formation 50 is shown. The formation 50 is penetrated by at least one injection well 40 and at least one production well 42. A packer 51 is provided in injection well 40 and a packer 53 is provided in production well 42. These packers are provided to facilitate controlling the pressure on formation 50 by known techniques of repressuring and/or pressure relief at the various wells intersecting the formation. A source of solvent 52 which may be, for example, butane which contains four carbon atoms is provided in fluid communication through appropriate piping with formation 50 through injection well 40. Other solvents which are useful in the present invention include propane and heavier hydrocarbons. The solvent may be injected into formation 50, for example, by means of compressor 56, pipes 58, valve 59 and pipe 57 in injection well 40.

A source of gas 62, for example methane which contains one carbon atom, is provided in fluid communication with formation 50 through injection well 40. Other gases useful in the invention include ethane, flue gas, and nitrogen. The gas may be injected into formation 50 by means of compressor 66, pipes 68, valve 69 and pipe 57 in injection well 40.

Formation 50 in FIG. 1 is divided schematically into ZONE A, ZONE B and ZONE D for convenience in describing the fluid saturations assumed in a two-phase solvent flood according to the present invention. The assisted recovery flood by the method of the invention has proceeded for some time in order to establish the zones as shown in FIG. 1. A two-phase solvent and gas bank is established in formation 50 by injecting an amount of solvent and gas into the formation. Butane is one example of a suitable solvent. Butane contains four carbon atoms and for purpose of description will be represented as $C_4$ in FIG. 1.

The amount of solvent injected into a formation is given as a percentage of the hydrocargon pore volume of the formation through which the solvent will be moved. Hydrocarbon pore volume means the pore volume of the formation which is available for occupancy by hydrocarbons. It has been found that greatly improved results are obtained when at least .025 hydrocarbon pore volumes of liquid solvent are injected into a formation. A slug of liquid solvent equivalent to .025 pore volume injected into a formation and moved through the formation by the method of the present invention recovered about .1 pore volume additional of oil about that recovered by a conventional gas drive without solvent. An .05 of a pore volume of liquid solvent moved through the formation by the method of the invention recovered about four times its volume in additional oil over a conventional gas drive. It has been found that .20 hydrocarbon pore volume of liquid solvent recovered substantially all of the oil from a formation. It is desirable then that at least .025 hydrocarbon pore volume of liquid solvent and not more than .20 hydrocarbon pore volume of liquid solvent be injected into the formation in an assisted recovery flood by the method of the present invention. Preferred solvents for use in the invention include propane, butane and heavier hydrocarbons. Methane is usually the preferred injection gas. Other gases which might be used in place of methane include ethane. It has been found that under some special conditions nitrogen and flue gas are highly desirable driving gases.

After a predetermined amount of solvent and gas are injected into the formation to establish the two-phase bank the solvent injection is stopped. Gas injection, for example methane which is represented by $C_1$ in FIG. 1 is continued. The injection pressure of the gas must be closely controlled to provide the desired relationship between $C_1$ and $C_4$ in the formation. In the oil-producing art the static pressure of the producing formation is known or can be readily ascertained by those skilled in the art. The pressure in the producing formation is closely controllable by means of gas injection or pressure relief at one or more of the wells in the field.

It has been found that improved results can be obtained by solvent flooding when the solvent is transported through the reservoir by a driving gas in two-phase relationship with the gas. To develop and maintain a two-phase relationship between the solvent and the gas in the formation the pressure on the gas and solvent in the formation must be controlled within certain definite limits for a particular formation and the particular gas and solvent employed. The formation temperature must be known or determined prior to practicing the present invention since the pressure at which the solvent and driving gas will exist in two phases varies with temperature.

Again referring to FIG. 1, ZONE B represents the two-phase gas and solvent zone. When the pressure on ZONE B is controlled within predetermined limits both a liquid phase and a gas phase will exist for some compositions of solvent and gas. There is a gas phase in which $C_1$ and $C_4$ are gaseous and there is a liquid phase in which $C_1$ and $C_4$ are liquid. The two-phase relationship between the solvent and gas is maintained by controlling the formation pressure as the solvent is moved through the formation by the driving gas.

Gas is continually injected at a closely controlled pressure and rate to maintain the pressure on the gas and solvent in ZONE B within the desired limits and to move the gas and solvent bank through the formation at a desired rate of advance. Zone A represents a region in the formation that has been swept free of oil as the two-phase gas and solvent bank indicated in ZONE B moves out into the formation. ZONE A therefore contains primarily gas which is flowing toward production well 42. As the gas initially contacts the solvent in ZONE B some of the solvent is taken up in the gas and a gaseous phase results as indicated by the $C_1+C_4$ gas phase in ZONE B. Some of the gas is absorbed by the solvent resulting in the liquid phase $C_4+C_1$, shown in ZONE B.

As the gas phase containing $C_1+C_4$ in ZONE B comes in contact with the oil represented by $C_7+$ in the formation, the solvent $C_4$ which is miscible with the oil $C_7+$ in all proportions is deposited as a liquid and the gas $C_1$ flows through the oil $C_7+$ toward the producing well 42. Some oil $C_7+$ is picked up in the gas as it flows through the oil $C_7+$. This phenomenon is represented by the $C_1+C_7+$ region in ZONE D. Some gas is also absorbed in the oil and is represented by the $C_7+C_1+$ region in ZONE D. The amount of component exchange between the oil $C_7+$ and the driving gas $C_1$ in ZONE D depends on the composition of the oil and gas and on the temperature and pressure at ZONE D. The main bank of oil, however, is moved just ahead of the two-phase bank of ZONE B toward producing well 42 where the effluent resulting from the assisted recovery drive is produced. Production at well 42 is accomplished while maintaining desirable pressure on well 42 which may be adjusted to control the pressure on the gas and solvent in ZONE B. The production is accomplished, for example, through a conventional pump and sucker rod arrangement designated as 63 in FIG. 1.

Figure 2:
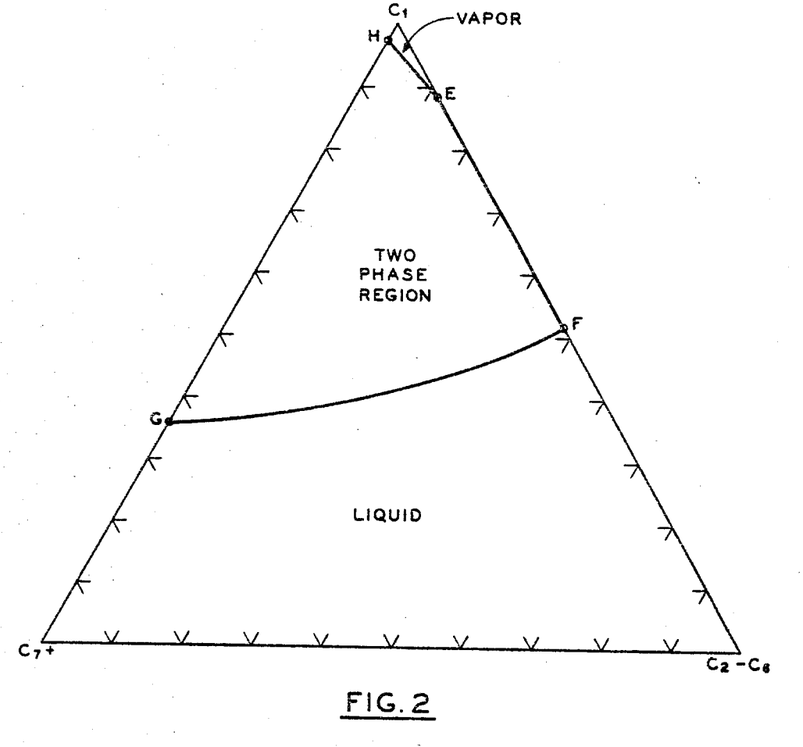
FIG. 2 is an example phase diagram for a three-component system with partial miscibility between $C_1$ and $C_2$–$C_6$.

Referring to FIG. 2, an example phase diagram for a three-component system with partial miscibility between solvent and gas phases is shown. For convenience the multiplicity of hydrocarbons which comprises a gas-solvent-crude oil system is reduced to a three-component system. Gas is represented by $C_1$, the solvent by $C_2-C_6$, and the crude oil by $C_7+$. Each corner of the triangle in FIG. 2 is designated as either $C_1$, $C_2-C_6$, or $C_7+$ and each corner of the triangle represents 100 percent of the there stated component. A phase diagram is drawn for the components at a given temperature and pressure. The phase diagram of FIG. 2 is drawn to represent the behavior of the three components at constant pressure and known temperature. The pressure on the solvent and gas illustrated in the phase diagram of FIG. 2 is a pressure between the vapor pressure of the solvent and the highest pressure at which two phases of gas and solvent can exist. The highest pressure at a given temperature at which two phases of a given gas and solvent will exist in both a gas phase and a liquid phase is called the critical pressure. At higher pressures only a single phase will exist at the given temperatrue. See, for example, the discussion of "Critical Phenomena" by O. K. Rice in "Thermodynamics and Physics of Matter," editor F. D. Rossini, Princeton University Press (1955), pp. 486–497.

The two-phase envelope G, F, E, and H which bounds the area in the phase diagram labeled "TWO PHASE REGION" in FIG. 2 intersects both the $C_1-C_7+$ leg of the triangle and the $C_1-C_2-C_6$ leg of the triangle. That is, the gas $C_1$ and the solvent $C_2-C_6$ are not miscible in all proportions at the pressure and temperature of FIG. 2. Point E is the composition of a gas which is in equilibrium with a liquid of composition F. If a gas of composition E is injected, the original oil indicated by $C_7+$ is enriched by successive contacts with the injected gas. The oil enriches to a composition which lies on a tie line passing through the composition of the injected gas. The final composition of the enriched oil must correspond to the composition F because that is the liquid composition on the tie line through E. The final enriched oil phase, F, contains none of the original $C_7+$. Thus, by successive condensation of intermediate components, the original $C_7+$ has been completely displaced.

A bank of liquid corresponding to the composition F is developed displacing the oil ahead of it. However, E and F are not miscible. Therefore some compositions of gas and solvent will exist both in a gas phase and a liquid phase and the oil represented by $C_7+$ can be completely displaced by the two-phase solvent-gas zone.

Accordingly in the method of the present invention then, a fluid of a composition corresponding to Point E must be injected into or generated in the oil-bearing formation. The pressure on the formation is controlled to maintain the fluid at this composition as it is moved through the formation by driving gas. A composition corresponding to Point E is a dew-point mixture of gas and solvent. A dew-point mixture is a vapor mixture which is at equilibrium with the liquid phase of solvent and gas at a given pressure and temperature.

A two-phase solvent and gas region is established in the formation by injecting the solvent and gas into the formation through an injection well. The preferred method of establishing the two-phase region includes the steps of adjusting the pressure of the formation in which said two-phase region is to be established to a predetermined value, said value being greater than the vapor pressure of the solvent at the temperature in said formation but less than the critical pressure for the gas and solvent at said formation temperature; mixing the solvent and gas prior to injection into the formation in a mixture having the mol percent of solvent at least equal to the mol percent solvent in the dew-point vapor for the gas and solvent mixture at formation temperature and said predetermined pressure value; then injecting said mixture through an injection well into said formation. Following the injection of said mixture, gas alone is injected through said injection well into said formation to move the solvent through the formation while the pressure on the formation is maintained at a value between the vapor pressure of the solvent and the critical pressure of the gas and solvent at said formation temperature. The produces of the assisted recovery drive are recovered from production wells which penetrate the formation.

The solvent and gas are preferably mixed in the predetermined proportions prior to injection into the formation. It is possible to inject the solvent alone into the formation and to then inject the driving gas at a controlled pressure to generate the two-phase region in the formation. However it has been discovered that about 10% additional oil is recovered when the solvent and gas are mixed prior to injection of the mixture into a pressure adjusted formation. Therefore, it is a particular feature of this invention to mix the solvent and gas in predetermined proportions prior to injecting the mixture into the formation.

The method of the present invention provides for moving a solvent through a petroliferous formation with a driving gas while maintaining a pressure on the formation so that two phases of solvent and gas exist in the formation as the gas and solvent proceeds through the formation. A solvent and gas will exist in two phases at constant temperature at any pressure falling between the vapor pressure of the solvent and the critical pressure for the solvent and gas. Both above and below these pressure limits only one phase will exist for any composition of gas and solvent. The solvent vapor pressure and the critical pressure of the solvent and gas vary with temperature. Since the temperature in different producing formations may vary over a considerable range the temperature of the particular formation must be determined. There are numerous methods well known in the art for determining the temperature of a producing formation. For example, the temperature may be determined from thermocouples which are lowered into wells intersecting the formation and allowed to come to thermal equilibrium. If desired, a number of readings can be taken in this manner from different wells intersecting the formation and averaged to arrive at an average formation temperature.

Once the temperature of a formation is known and the desirable solvent and driving gas selected, the pressure at which two phases of gas and solvent will be present in the formation may be determined from a table such as found below.

TABLE 1.—METHANE AND PROPANE

| Temperature (° F.) | Vapor pressure of solvent (p.s.i.a.) | Critical pressure (p.s.i.a.) |
|---|---|---|
| 70 | 125 | 1,440 |
| 100 | 189 | 1,353 |
| 130 | 274 | 1,210 |
| 160 | 384 | 1,020 |
| 190 | 525 | 800 |
| *206.3 | 617.4 | 617.4 |

*Critical temperature and pressure for propane.

TABLE 2.—METHANE AND n-BUTANE

| Temperature (° F.) | Vapor pressure of solvent (p.s.i.a.) | Critical pressure (p.s.i.a.) |
|---|---|---|
| 100 | 52 | 1,912 |
| 130 | 81 | 1,876 |
| 160 | 121 | 1,810 |
| 190 | 174 | 1,698 |
| 220 | 241 | 1,520 |
| 250 | 328 | 1,264 |

TABLE 3.—NITROGEN AND n-BUTANE

| Temperature (° F.) | Vapor pressure of solvent (p.s.i.a.) | Critical pressure (p.s.i.a.) |
|---|---|---|
| 100 | 51.5 | 4,100 |
| 160 | 120.6 | 3,050 |
| 220 | 241.2 | 2,100 |
| 280 | 436.0 | 1,070 |

TABLE 4.—ETHANE AND n-BUTANE

| Temperature (° F.) | Vapor pressure of solvent (p.s.i.a.) | Critical pressure (p.s.i.a.) |
|---|---|---|
| 100 | 52 | 740 |
| 130 | 81 | 803 |
| 160 | 121 | 838 |
| 220 | 241 | 810 |
| 250 | 328 | 750 |

In one aspect then the method of the present invention improves the recovery of petroleum from a petroliferous formation by the steps of establishing a two-phase solvent and gas region in said formation, injecting additional gas into said formation to move the solvent substantially through said formation at a predetermined linear rate of advance of said two-phase region while maintaining the pressure on said formation at a value between the vapor pressure of said solvent at the formation temperature and the critical pressure for the gas and solvent at formation temperature to cause two phases of gas and solvent to exist in the formation.

Table 5 below gives the results of laboratory core flooding experiments according to the method of the present invention. The core used in these experiment was a 5-foot long consolidated sandstone core. The experiments were run at 73° F.

TABLE 5.—RESULTS OF LABORATORY EXPERIMENTS

| Gas and solvent | Pressure (p.s.i.a.) | Pore volumes gas at formation pressure | Oil recovery percent orig. |
|---|---|---|---|
| Methane-butane | 45 | 12.5 | 80 |
| Do | 1,515 | 5.4 | 88 |
| Do | 1,815 | 2.5 | 92 |
| Methane-propane | 215 | 6.1 | 77 |
| Do | 1,215 | 3.1 | 78 |
| Nitrogen-butane* | 45 | 12 | 84 |
| Nitrogen-butane | 45 | 12 | 71 |

As is evident from Table 5 the method of the invention provides for a high percentage of oil recovery. It is important to note the improved recovery shown in the nitrogen-butane flood marked by an asterisk over the nitrogen-butane flood not marked by an asterisk. In the former flood the nitrogen and butane were injected as a dew-point mixture and then followed by nitrogen alone. The dew-point mixture was prepared by bubbling gas through the solvent at the pressure and temperature conditions of the core. In the latter case the butane was injected as a liquid and then nitrogen was injected to generate a two-phase region which was subsequently moved through the core. The former method of establishing the two-phase region results in about 10% better oil recovery. In all of the other experiments the gas and solvent were injected as a dew-point mixture. In all cases .1 pore volume of liquid solvent was injected.

As dscussed above desirable results are obtainable by moving a solvent bank through a formation at a linear rate of advance of between 0.2 ft. and 3 ft./day with a driving gas while maintaining the pressure on the solvent and the gas to cause two phases of gas and solvent to be present in the formation. In this manner the solvent is transported primarily in the vapor phase and deposited as a liquid. The solvent is picked up and deposited in repeated steps as it moves through the formation. By maintaining the pressure within predetermined limits two phases of gas and slovent will exist during the course of the assisted recovery flood. In order to obtain maximum oil recovery by the method of the invention the driving gas and solvent must be distributed in the formation according to their equilbrium ratios between the liquid and gaseous phases. To allow equilbrium to be obtained it has been found that the linear rate of advance of the solvent bank through the formation must not exceed about three feet per day. On the other hand, at very low rates, less than 0.1 to 0.2 feet per day, gravity segregation of the solvent and oil may occur, resulting in inefficient use of the solvent. Therefore in accordance with this invention the rate of advance of the two-phase solvent and gas bank in the formation is controlled between about 0.2 ft. per day and about 3 ft. per day.

One method of determining the gas injection rate which will result in a given linear rate of advance for the two-phase solvent bank is obtained for a linear system from the following equation:

$$q_A = PV_{inj.} \phi A \frac{dl}{dt}$$

where $q_A$ is the gas injection rate,
$PV_{inj.}$ is the total pore volumes of carrier gas which must be injected to produce the leading edge of the solvent bank, where A is the cross-sectional area of the formation,
$\phi$ is the porosity of the formation, and
$dl/dt$ is the rate of advance of the solvent bank.

The gas volumes calculated from the equation will be at reservoir pressure and temperature.

In lieu of determining the rate of advance by the equations given above, the linear rate of advance of the two-phase solvent bank through the formation may be determined mechanically by drilling observation wells at known distances from the injection wells. Samples are taken from the observation wells periodically and analyzed. When the two-phase bank arrives at the observation wells it will show up in the sample. The time required from injection to arrival is recorded and knowing the distance traveled by the two-phase bank the rate may be calculated. Adjustments can then be made in the gas injection rate if necessary to bring the rate of advance of the solvent bank within the desired limits.

In the broad operational pressure limits for maintaining a two-phase region in the formation there are pressure ranges where especially surprising and desirable results are obtainable. It has been discovered that a greatly improved gas-oil producing ratio (GOR) at the producing well is obtained if the pressure maintained on the solvent and gas region as it moves through the formation is adjusted to a value close to the critical pressure of the solvent and gas at formation temperature.

In two-phase solvent flooding by the method of the present invention it has been discovered that the amount of gas needed for injection into the formation in back of the injected solvent to establish the two-phase region and to move the two-phase region substantially through the formation to a producing well is at a minimum at a pressure close to the critical pressure of the gas and solvent at the formation temperature. As was discussed heretofore, it was known in the art that a solvent could be moved through a formation at a pressure at about the vapor pressure of the solvent. It was also believed that as the pressure was increased above the solvent vapor pressure, the amount of gas required to move the solvent through the formation would increase and soon become prohibitive. It is very surprising and unobvious that the gas requirements are at a minimum at formation pressures close to the critical pressure for the solvent and gas at formation temperature. This is an important discovery because the advantages of two-phase solvent flooding can be obtained in formations at greatly increased pressures over those heretofore thought possible while still maintaining a favorable gas and oil-producing ratio by controlling the pressure on the solvent and gas in the formation at a pressure close to the critical pressure of the solvent and gas at formation temperature.

In the oil-producing art the gas and oil-producing ratio (GOR) is defined as the ratio of produced gas to produced oil at a production well. In assisted recovery drives wherein a driving gas is utilized most of the produced gas is injected gas since most of the primary gas is usually gone from formations which are subjected to an assisted recovery drive. Therefore the producing gas and oil ratio is directly related to the amount of gas required to move the solvent through a formation. It is highly desirable to have as small a GOR as possible since from an economic standpoint the expense involved not only in injecting additional volumes of gas but also of producing the additional volumes of gas may be prohibitive. One skilled in the art of oil recovery by assisted recovery methods can determine a limiting GOR for a particular solvent and gas drive. Many factors must be considered in determining the limiting GOR. Included are the availability and cost of gas, the cost of producing additional gas with the oil produced, the cost of gas versus the value of additional oil recovered. Once the upper GOR has been determined, the method of the present invention provides for maintaining the pressure on the two-phase solvent and gas zone at a value at which the producing GOR will be below the predetermined upper limit.

The total pore volumes of driving gas required to establish and move the solvent through the formation according to the method of the invention can be closely approximated from a material balance equation at the leading edge of the solvent bank. If the leading edge of the bank advances a distance $dl$ in time $dt$ a material balance can be written for the volume, $\phi A dl$, where $A$ is the cross-sectional area of the formation and $\phi$ is the porosity of the formation.

The moles of driving gas, for example methane, entering $\phi A dl$ during time $dt$ less the moles leaving must equal the change in the number of moles present in that volume.
Thus, $$\text{moles of carrier gas in} = \frac{q_B(1-y_s)dt}{V_{MB}} \quad (1)$$

$$\text{moles of carrier gas out} = \frac{q_D dt}{V_{MD}} \quad (2)$$

where $q_B$ = gas flow rate in ZONE B. (See FIG. 1.)
$q_D$ = gas flow rate in ZONE D. (See FIG. 1.)
$y_S$ = mole fraction of solvent in the gas phase, ZONE B. (See FIG. 1.)
$V_{MB}$ = molar volume of gas in ZONE B. (See FIG. 1.)
$V_{MD}$ = molar volume of gas in ZONE D. (See FIG. 1.)

The change in the moles of carrier gas in the region $\phi A d$ is the final moles minus the initial moles present.

$$\text{Final} = \phi A dl \frac{S_L(1-x_s)}{V_{ML}} + \phi A dl \frac{(1-S_L)(1-y_s)}{V_{MB}} \quad (3)$$

$$\text{Initial} = \phi A dl \frac{(1-S_{OD})}{V_{MD}} \quad (4)$$

where $S_L$ = assumed liquid solvent saturation in ZONE B. (See FIG. 1.)
$V_{ML}$ = molar volume of liquid containing solvent.
$x_S$ = mole fraction of solvent in liquid phase.
$S_{OD}$ = oil saturation in ZONE D. (See FIG. 1.)

Therefore:

$$\left[ q_B \frac{(1-y_s)}{V_{MB}} - \frac{q_D}{V_{MD}} \right] dt =$$
$$\phi A dl \left[ \frac{S_L(1-x_s)}{V_{ML}} + \frac{(1-S_L)(1-y_s)}{V_{MB}} - \frac{(1-S_{OD})}{V_{MD}} \right] \quad (5)$$

Similarly, a balance can be written for the solvent assuming the flow rate of liquid solvent is negligible, $$\frac{q_B y_s}{V_{MB}} dt = \phi A dl \frac{S_L x_s}{V_{ML}} + \frac{(1-S_L) y_s}{V_{MB}} \quad (6)$$

One other equation is required to relate the flow rates in the various regions.

$$q_D = q_A - q_0 = q_A - \phi A S_{OD} \frac{dl}{dt} \quad (7)$$

where $q_A$ is the flow rate of gas in region A and $q_0$ is the oil flow rate in ZONE D. (See FIG. 1.)

$q_D$ from Equation 7 and $q_B$ from Equation 6 are substituted in Equation 5. When the resulting equation is simplified, the following equation is obtained.

$$q_A dt = \phi A dl \left[ S_L \frac{x_s}{y_s}(1-y_s) \frac{V_{MD}}{V_{ML}} - S_L(1-x_s) \frac{V_{MD}}{V_{ML}} + 1 \right] \quad (8)$$

Equation 8 can be further simplified and integrated to give $$PV_{inj.} = \frac{V_{MD}}{V_{ML}} S_L \left( \frac{x_s}{y_s} - 1 \right) + 1 \quad (9)$$

in which $PV_{inj.}$ is the total pore volumes of carrier gas which must be injected to produce the leading edge of the solvent bank. This derivation neglects the volume occupied in the porous medium by the solvent bank. The volume of gas produced before the leading edge of the solvent bank is:

$$PV_{prod.} = \frac{V_{MD}}{V_{ML}} S_L \left( \frac{x_s}{y_s} - 1 \right) \quad (10)$$

This volume is measured at the reservoir temperature and pressure. If the volume of gas is measured at another pressure and temperature the equation becomes $$PV_{prod.} = \frac{V_{MG}}{V_{ML}} S_L \left( \frac{x_s}{y_s} - 1 \right) \quad (11)$$

in which $V_{MG}$ is the molar volume of the carrier gas at the specified measuring conditions. From experimental results it can be assumed that about 80% of the oil initially in the formation is produced in the oil bank. If the initial oil saturation is assumed to be 75% then:

$$GOR_{avg.} = \frac{PV \text{ gas prod.}}{(.8)(.75)} (5.62)$$

The 5.62 converts $PV$'s/$PV$ to cubic feet per barrel.
Letting $K_s = y_s/x_s$ then from Equation 11

$$PV_{prod.} = \frac{V_{MG}}{V_{ML}} (1/K_s - 1) \quad (12)$$

Figure 3:
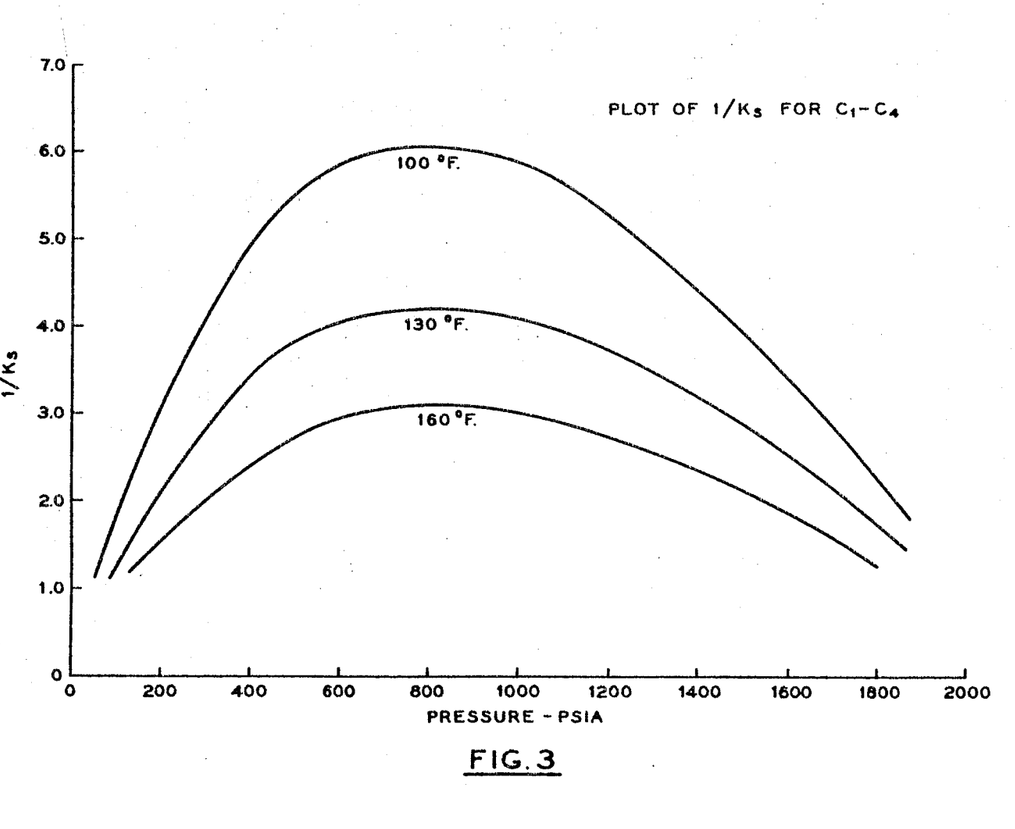
FIG. 3 is a curve of $1/K_s$ for a methane-butane system.
Figure 4:
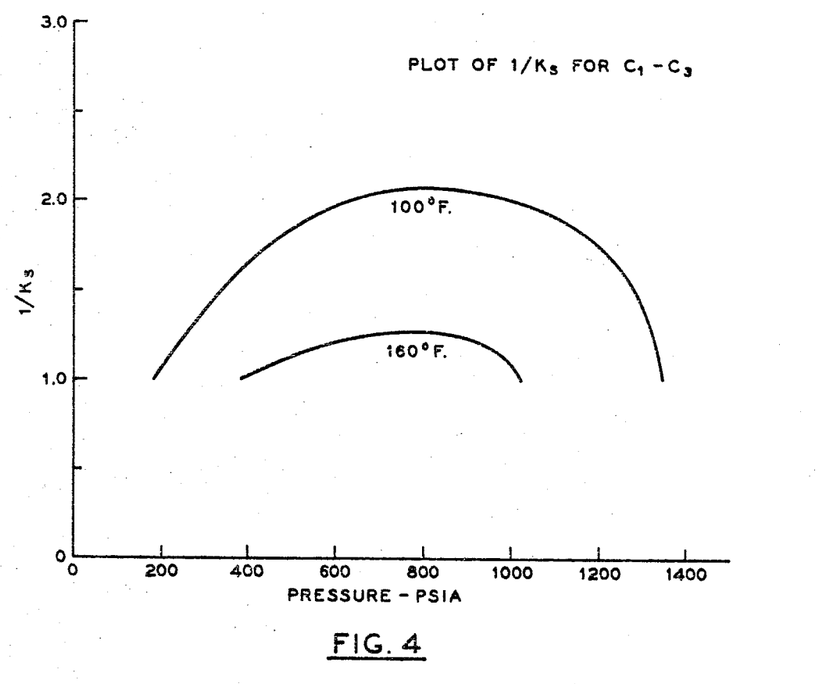
FIG. 4 is a curve of $1/K_s$ for a methane-propane system.
Figure 5:
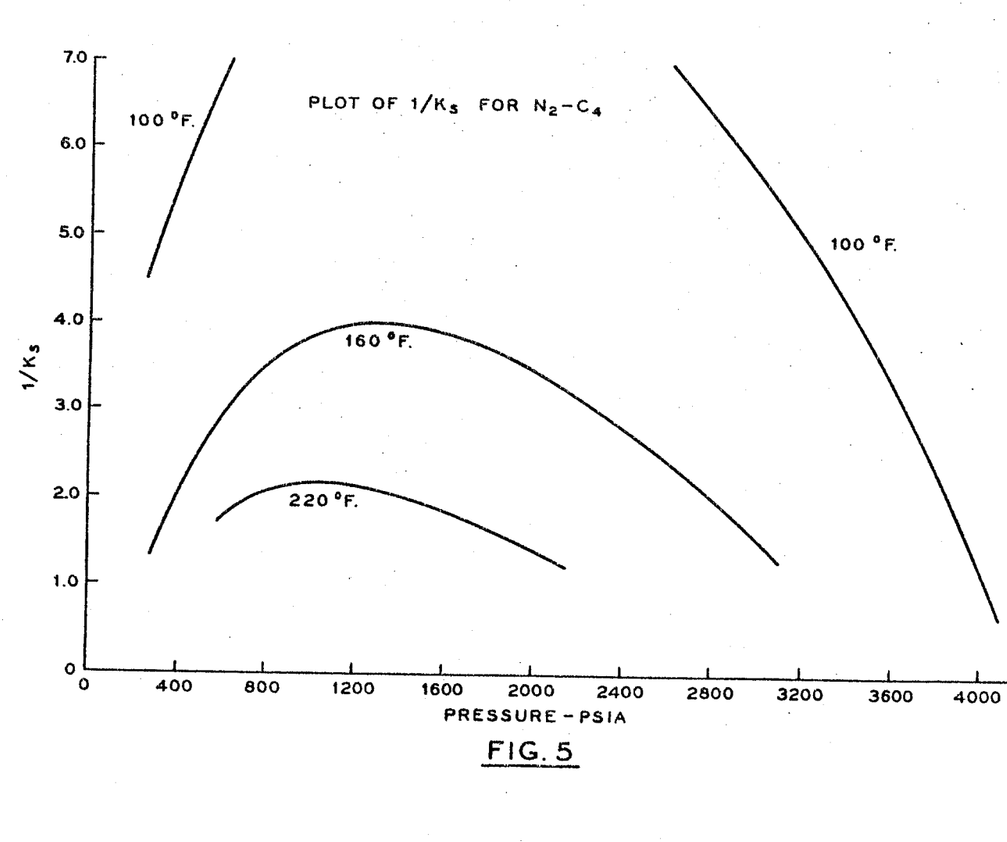
FIG. 5 is a curve of $1/K_s$ for a nitrogen-butane system.

With particular reference to FIGS. 3, 4, and 5 curves of $1/K_s$ versus pressure are shown for three solvent and gas systems at constant temperatures. FIG. 3 shows a plot of $1/K_s$ for a methane ($C_1$) and butane ($C_4$) system. As there shown, three curves of $1/K_s$ for methane and butane are plotted against pressure at three temperature levels. Each curve is plotted at the temperature noted adjacent the curve. As was shown in the calculations above, $1/K_s$ is directly related to the producing gas-oil ratio (GOR) and also to the gas required to move the solvent through the formation.

Accordingly then the preferred embodiment of this invention comprises the method of assisting the recovery of petroleum from a petroleum-bearing formation penetrated by at least one injection well and one recovery well comprising determining the temperature of said formation, selecting an oil-miscible solvent and a gas for injection into said formation, determining the pressure between the vapor pressure of the solvent at formation temperature and the critical pressure for the solvent and gas at formation temperature at which pressure the greatest amount of gas will be required to move the solvent through the formation in two-phase relationship with said gas, adjusting the formation pressure to a value between the critical pressure of the solvent and gas at formation temperature and said determined pressure, mixing said solvent and said gas in a mixture, said mixture having the mol percent of solvent at least equal to the mol percent solvent in the dew-point vapor for the gas and solvent mixture at formation temperature and adjusted formation pressure, injecting said mixture through said injection well into said formation, following the injection of said mixture injecting gas through said injection well into said formation to move said solvent through said formation while maintaining the pressure on said formation at said value, and recovering the resulting effluent through said production well.

If for the sake of example in a methane-butane assisted recovery flood according to the present invention a limiting economic GOR of 3000 s.c.f.b. is assumed as the upper limiting GOR then $$PV_{prod.} = \frac{(.6)(3000)}{5.62}$$

$$= 320$$

substituting this value in 12 when $$V_{MG} = 380 \text{ at standard conditions}$$

$$V_{ML} = 1.6 \text{ ft.}^3/\text{mol}$$

$$S_L = 0.4$$

$$320 = \frac{380}{1.6}(.4)(1/K_s - 1)$$

$$1/K_s = 4.4$$

It is apparent from FIG. 3 that in a formation having a temperature of about 100° F. wherein a methane (gas) and butane (solvent) two-phase flood is contemplated and the limiting producing gas and oil ratio is 3000 s.c.f.b. there are two pressure ranges where the GOR will be less than 3000. As shown in FIG. 3 these two ranges are from the vapor pressure of butane at 100° F. to about 375 p.s.i. and from about 1450 p.s.i. to the critical pressure of the solvent and gas at 100° F.

Another aspect of the present invention then comprises determining an upper limit for the producing gas and oil ratio, determining the pressure ranges in which the producing gas and oil ratio will not exceed said determined upper limit, establishing a two-phase solvent and gas region in a formation, controlling the pressure of said formation to a value within said determined pressure ranges, injecting additional gas into said formation to move said solvent substantially through said formation at a controlled frontal rate of advance while maintaining said formation pressure at said value and producing oil from said formation.

With reference to FIG. 3, FIG. 4, and FIG. 5 the curves shown in the figures illustrate the relationship between $1/K_s$ and the pressure of the formation. The value $1/K_s$ is directly related to the amount of gas required to move the solvent through the formation in two-phase relationship with the driving gas. The curves show that for each solvent and gas system there is a low gas requirement at a pressure near the vapor pressure of the solvent. As discussed earlier with reference to the prior art, the amount of gas required increases rapidly as the pressure increases above the vapor pressure of the solvent. However, it has been discovered that the gas requirement reaches a maximum and then starts to decrease sharply as the pressure is increased toward the critical pressure of the solvent and gas.

It is a particular aspect of the invention then to determine the temperature of a formation and to select a solvent and gas for injection into said formation. Then the pressure between the vapor pressure of the solvent at said determined temperature and the critical pressure for the solvent and gas at said determined temperature at which pressure the greatest volume of gas will be required to move the solvent through the formation in two-phase relationship with the gas is determined. This pressure is determinable by means of the equations presented above. The pressure of the formation is adjusted to a value between the critical pressure for said solvent and gas at formation temperature and the pressure at which the greatest volume of gas will be required to move the solvent through the formation. The solvent and gas are injected into the formation as provided by the present invention and the pressure on the formation is maintained at about said value.

With particular reference to FIG. 3, curves of $1/K_s$ for methane and butane at 100° F., 130° F., and 160° F. are shown. Gas requirements are low near the critical pressure of the gas and solvent. This pressure varies some with temperature but in general is between 1800 p.s.i.a. and 2000 p.s.i.a. The amount of methane required to move the butane through the reservoir is at a maximum at about 800 p.s.i.a. The pressure at which the maximum amount of gas is required can be determined exactly from the formula given above. Accordingly it is a particular feature of this invention to adjust the pressure of an oil-bearing formation to a value between about 800 p.s.i.a and the critical pressure of methane and butane at the temperature of said formation, injecting butane and methane through an injection well into said formation to establish a two-phase gas and solvent bank in said formation, injecting additional methane into said formation to move said two-phase bank through said formation while maintaining the pressure on said formation at about said value, and recovering the resulting effluent from said formation through a production well.

With reference to FIG. 4 curves of $1/K_s$ are plotted for 100° F. and 160° F. As there shown the amount of methane required to move a two-phase methane-propane bank through a formation is at a maximum at a pressure of about 900 p.s.i.a. The gas requirement falls rapidly at pressures above 900 p.s.i.a until the critical pressure is reached for the methane and propane. Therefore a particular feature of the invention comprising adjusting the pressure on the formation to a value between about 900 p.s.i.a. and the critical pressure for methane and propane at the temperature of said formation, establishing a two-phase methane-propane bank in said formation and injecting additional methane into said formation while controlling the pressure on said formation at about said value to move the two-phase bank substantially through said formation and recovering petroleum products from said formation through a production well.

With reference to FIG. 5 three curves of $1/K_s$ versus pressure are plotted at three constant temperatures for butane (solvent) and nitrogen (gas). The temperature at which each curve was plotted is indicated. As was indicated above $1/K_s$ is directly related to the producing gas and oil ratio and therefore to the amount of gas required to move the solvent through the formation in two-phase relationship with the gas. As shown in FIG. 5 there is a relatively narrow range of pressures, at lower temperatures at which a two-phase nitrogen and butane assisted recovery may be accomplished with a relatively small amount of injected driving gas. Thus in formations having a temperature of about 100° F. the formation pressure must be adjusted to a value between about 3400 p.s.i.a. and about 4100 p.s.i.a. to move a two-phase nitrogen and butane region through the formation with a minimum injection of nitrogen.

It is especially surprising that a two-phase flood by the method of the present invention is possible with a solvent and a gas such as nitrogen and butane or nitrogen and propane at elevated pressure, such as a pressure approaching the critical pressure of the two components, without having an extremely high gas and oil-producing ratio. One skilled in the art would expect the producing gas and oil ratio to become increasingly large as the pressure is increased, especially when utilizing two components such as nitrogen and butane or nitrogen and propane which are relatively insoluble in each other at standard conditions compared to methane and propane for example.

Therefore, a particular feature of this invention comprises establishing a two-phase region composed of nitrogen and a solvent, for example propane or butane, in an oil-producing formation, injecting additional nitrogen into said formation to move said solvent substantially through said formation while maintaining the pressure on said formation at a value between the critical pressure of the nitrogen and the solvent at formation temperature and the pressure at which the amount of injected nitrogen needed to move the solvent through the formation in two-phase relationship is at a maximum.

It is a particular aspect of the invention to adjust the pressure on the formation to a value about equal to but not exceeding the critical pressure for the nitrogen and solvent at said formation temperature and to establish a two-phase region composed of nitrogen and said solvent in the formation. Additional nitrogen is then injected to move the solvent through the formation while the pressure on the solvent is maintained at about said value and the resulting effluent is recovered from said formation.

Again referring to FIG. 5, the curves for temperatures of 160° F. and 220 F. while not as spectacular as the lower temperatures, also indicate that improved GOR's can be obtained when two-phase assisted recovery is practiced in a formation where the pressure is controlled at about the critical pressure of the solvent and gas at formation pressure. Specifically, the preferred range for formations having a temperature of about 160° F. is from about 2100 p.s.i.a. to the critical pressure of butane and nitrogen at 160° F. The preferred range for formations of about 220° F. is from about 1600 p.s.i.a. to the critical pressure of nitrogen and butane at 220° F.

As is evident from the above, this invention broadly concerns a new concept of assisted recovery flooding with gas and a solvent being moved through a formation while the formation pressure is maintained within critical limits to cause two phases of gas and solvent to exist in the formation. Certain especially desirable and surprising aspects of the invention have been disclosed. Pressure limits have been given to take advantage of these particularly surprising and desirable aspects. Although only a few specific embodiments of the present invention have been expressly described herein the scope of the invention is not limited to those embodiments specifically disclosed but only by the scope of the appended claims.

Having disclosed the invention, what is claimed is:

1. A method of assisting the recovery of oil from an oil-bearing formation penetrated by at least one injection well and one production well comprising selecting an oil miscible solvent and a gas for injection into a formation, said solvent being liquefiable at formation temperature and said gas being noncondensable below the critical pressure for the solvent and gas mixture at formation temperature, adjusting the pressure of said formation to a predetermined value, said value being greater than the vapor pressure of the solvent at the formation temperature but less than the critical pressure of the gas and solvent at said formation temperature, mixing said solvent and said gas in a mixture, said mixture having the mol percent of solvent at least equal to the mol percent solvent in the dew-point vapor for the gas and solvent mixture at formation temperature and adjusted formation pressure, the mol percent of solvent in said mixture being no more than the mol percent of solvent in a bubble-point liquid at said formation temperature and adjusted formation pressure, injecting said mixture through said injection well into said formation in an amount sufficient to insure that at least a portion of the resulting bank of said mixture in said formation can be moved substantially through said formation to said production well, following the injection of said mixture injecting gas through said injection well into said formation to move said solvent through said formation while maintaining the pressure on said formation at said value, and recovering the resulting effluent through said production well.

2. A method of assisting the recovery of oil from an oil-bearing formation penetrated by at least one injection well and one production well comprising selecting an oil miscible solvent and a gas for injection into a formation, said solvent being liquefiable at formation temperature and said gas being noncondensable below the critical pressure for the solvent and gas mixture at formation temperature, adjusting the pressure of said formation to a predetermined value, said value being greater than the vapor pressure of the solvent at the formation temperature but less than the critical pressure of the gas and solvent at said formation temperature, mixing the solvent and the gas in a mixture, said mixture having the mol percent of solvent at least equal to the mol percent solvent in the dew-point vapor for the gas and solvent mixture at formation temperature and adjusted formation pressure, the mol percent of solvent in said mixture being no more than the mol percent of solvent in a bubble-point liquid at said formation temperature and adjusted formation pressure, injecting said mixture through said injection well into said formation until at least an amount of solvent equivalent to .025 hydrocarbon pore volume is injected, following the injection of said mixture injecting gas through said injection well into said formation to move said solvent through said formation at a controlled rate of advance of not more than 3 ft. per day while maintaining the pressure on said formation at said value, and recovering the resulting effluent through said production well.

3. A method of assisting the recovery of petroleum from a petroliferous formation penetrated by at least one injection well and one recovery well comprising mixing a solvent selected from the group consisting of propane and butane and gas selected from the group consisting of methane, ethane, nitrogen and flue gas in a mixture, said mixture having the mol percent of solvent at least equal to the mol percent solvent in the dew-point vapor for the solvent and gas mixture at the formation temperature and at a predetermined pressure, said predetermined pressure having a value between the vapor pressure of the solvent at formation temperature and the critical pressure of the solvent and gas mixture at formation temperaure, the mol percent of solvent in said mixture being no more than the mol percent of solvent in a bubble-point liquid at said formation temperature and said predetermined pressure, injecting said mixture through said injection well into said formation until at least an amount of solvent equivalent to .025 hydrocarbon pore volume is injected, following the injection of said mixture injecting gas through said injection well into said formation to move said solvent through said formation while maintaining the pressure on said formation at a value between the vapor pressure of the solvent at formation temperature and the critical pressure of the solvent and gas mixture at formation temperature, and recovering the resulting effluent through said recovery well.

4. A method of assisting the recovery of oil from an oil-bearing formation penetrated by at least an injection well and a recovery well comprising determining the temperature of said formation, selecting an oil-miscible solvent from the group consisting of hydrocarbons having from three to six carbon atoms and selecting a gas from the group consisting of methane, ethane, nitrogen and flue gas for injection into said formation, adjusting the pressure of said formation to a predetermined value, said value being between the vapor pressure of said solvent at the determined formation temperature and the critical pressure of the gas and solvent at the determined formation temperature, mixing said solvent and said gas in a mixture, said mixture having the mol percent of solvent at least equal to the mol percent solvent in the dew-point vapor for the gas and solvent mixture at formation temperature and adjusted formation pressure, the mol percent of solvent in said mixture being no more than the mol percent of solvent in a bubble-point liquid at said formation temperature and said adjusted formation pressure, injecting said mixture through said injection well into said formation until at least an amount of solvent equivalent to .025 hydrocarbon pore volume has been injected into said formation, following the injection of said mixture injecting additional gas through said injection well into said formation to move said solvent through said formation while maintaining the pressure on said formation at said value, and recovering the resulting effluent through said production well.

5. The method of assisting the recovery of petroleum from a petroleum-bearing formation penetrated by at least one injection well and one recovery well comprising determining the temperature of said formation, selecting an oil-miscible solvent and a gas for injection into said formation, said solvent being liquefiable at formation temperature and said gas being noncondensable below the critical pressure for the solvent and gas mixture at formation temperature, determining the pressure between the vapor pressure of the solvent at formation temperature and the critical pressure for the solvent and gas at formation temperature at which pressure the greatest amount of gas will be required to move the solvent through the formation in two-phase relationship with the gas, adjusting the formation pressure to a value between the critical pressure of the solvent and gas at formation temperature and said determined pressure, mixing said solvent and said gas in a mixture, said mixture having the mol percent of solvent at least equal to the mol percent solvent in the dew-point vapor for the gas and solvent mixture at formation temperature and adjusted formation pressure, the mol percent of solvent in said mixture being no more than the mol percent of solvent in a bubble-point liquid at said formation temperature and adjusted formation pressure, injecting said mixture through said injection well into said formation in an amount sufficient to insure that at least a portion of the resulting bank of said mixture in said formation can be moved substantially through said formation to said production well, following the injection of said mixture injecting gas through said injection well into said formation to move said solvent through said formation while maintaining the pressure on said formation at said value, and recovering the resulting effluent through said recovery well.

6. A method of assisting the recovery of petroleum from a petroliferous formation penetrated by an injection well and a recovery well comprising determining the temperature of said formation, selecting an oil-miscible solvent from the group consisting of propane and butane and a gas from the group consisting of methane, ethane, nitrogen and flue gas for injection into said formation, determining an upper limit for the producing gas and oil ratio from said formation, determining a pressure at which the amount of gas required to move said solvent through said formation in two-phase relationship with said gas will not cause said determined upper limit for the producing gas and oil ratio to be exceeded, adjusting the pressure on said formation to a value between the critical pressure of the gas and solvent at said formation temperature and said determined pressure, mixing said solvent and said gas in a mixture, said mixture having the mol percent of solvent at least equal to the mol percent solvent in the dew-point vapor for the gas and solvent mixture at formation temperature and adjusted formation pressure, the mol percent of solvent in said mixture being no more than the mol percent of solvent in a bubble-point liquid at said formation temperature and adjusted formation pressure, injecting said mixture through said injection well into said formation until at least an amount of solvent equivalent to .025 hydrocarbon pore volume is injected, following the injection of said mixture injecting gas through said injection well into said formation to move said solvent through said formation while maintaining the pressure on said formation at said value, and recovering the resulting effluent through said recovery well.

7. A method of assisting the recovery of petroleum from a petroleum-bearing formation penetrated by at least one injection well and one production well comprising selecting a gas from the group consisting of methane, ethane, nitrogen and flue gas and a solvent from the group consisting of propane and butane for injection into said formation, adjusting the pressure on said formation to a predetermined value, said value being about equal to but not exceeding the critical pressure of the solvent and gas at the formation temperature, mixing said solvent and gas in a mixture, said mixture having the mol percent of solvent at least equal to the mol percent solvent in the dew-point vapor for the gas and solvent mixture at formation temperature and adjusted formation pressure, the mol percent of solvent in said mixture being no more than the mol percent of solvent in a bubble-point liquid at said formation temperature and adjusted formation pressure, injecting said mixture through said injection well into said formation until at least an amount of solvent equivalent to .025 hydrocarbon pore volume has been injected into said formation, following the injection of said mixture injecting gas through said injection well into said formation to move said solvent through said formation while maintaining the pressure on said formation at said value, and recovering the resulting effluent through said production well.

8. The method of assisting the recovery of petroleum from a petroleum-bearing formation penetrated by at least one injection well and one recovery well comprising adjusting the pressure of said formation to a value between about 800 p.s.i.a. and the critical pressure of methane and butane at the temperature of said formation, mixing said methane and butane in a mixture, said mixture having the mol percent of butane at least equal to the mol percent butane in the dew-point mixture for butane and methane at the temperature of said formation and at said value of pressure, the mol percent of butane in said mixture being no more than the mol percent of butane in a bubble-point liquid at said formation temperature and at said value of pressure, injecting said mixture through said injection well into said formation until at least an amount of solvent equivalent to .025 hydrocarbon pore volume has been injected into said formation, following the injection on said mixture injecting methane alone through said injection well to move said butane substantially through said formation while maintaining the pressure on said formation at about said adjusted value of pressure and recovering the resulting effluent through said recovery well.

9. The method of assisting the recovery of petroleum from a petroleum-bearing formation penetrated by at least one injection well and one recovery well comprising adjusting the pressure of said formation to a value between about 900 p.s.i.a. and the critical pressure of methane and propane at the temperature of said formation, mixing said methane and propane in a mixture, said mixture having the mol percent of propane at least equal to the mol percent propane in the dew-point mixture for propane and methane at the temperature of said formation and at said value of pressure, the mol percent of propane in said mixture being no more than the mol percent of propane in a bubble-point liquid at said formation temperature and at said value of pressure, injecting said mixture through said injection well into said formation until at least an amount of solvent equivalent to .025 hydrocarbon pore volume has been injected into said formation, following the injection of said mixture injecting methane alone through said injection well to move said propane substantially through said formation while maintaining the pressure on said formation at about said adjusted value of pressure and recovering the resulting effluent through said recovery well.

10. The method of assisting the recovery of petroleum from a petroleum-bearing formation penetrated by at least one injection well and one recovery well, said formation having a temperature of about 100° F. comprising adjusting the pressure of said formation to a value between 3400 p.s.i.a. and the critical pressure of nitrogen and butane at about 100° F., mixing said nitrogen and butane in a mixture, said mixture having the mol percent of butane at least equal to the mol percent butane in the dew-point mixture for butane and nitrogen at a temperature of about 100° F. and at said value of pressure, the mol percent of butane in said mixture being no more than the mol percent of butane in a bubble-point liquid at said formation temperature and said adjusted value of pressure, injecting said mixture through said injection well into said formation until at least an amount of solvent equivalent to .025 hydrocarbon pore volume has been injected into said formation, following the injection of said mixture injecting nitrogen alone through said injection well to move said butane substantially through said formation while maintaining the pressure on said formation at about said adjusted value of pressure and recovering the resulting effluent through said recovery well.

11. The method of assisting the recovery of petroleum from a petroleum-bearing formation penetrated by at least one injection well and one recovery well comprising adjusting the pressure of a petroleum-bearing formation to a value between about 800 p.s.i.a. and the critical pressure of a binary methane-butane system at the temperature of said formation, injecting at least .025 hydrocarbon pore volume of butane into said formation through an injection well, injecting methane into said formation through an injection well, permitting said methane to contact and to mix with said butane in said formation to establish a two-phase methane and butane region in said formation, continuing to inject methane through an injection well into said formation to move said butane substantially through said formation while maintaining the pressure on said formation between about 800 p.s.i.a. and the critical pressure of methane and butane at the temperature of said formation and recovering the resulting effluent from said formation through a recovery well.

12. The method of assisting the recovery of petroleum from a petroleum-bearing formation penetrated by at least one injection well and one recovery well comprising adjusting the pressure of a petroleum-bearing formation to a value between about 900 p.s.i.a. and the critical pressure of a binary methane-propane system at the temperature of said formation, injecting at least .025 hydrocarbon pore volume of propane into said formation through an injection well, injecting methane into said formation through an injection well, permitting said methane to contact and to mix with said propane in said formation to establish a two-phase methane and propane region in said formation, continuing to inject methane through an injection well into said formation to move said propane substantially through said formation while maintaining the pressure on said formation between about 900 p.s.i.a. and the critical pressure of methane and propane at the temperature of said formation and recovering the resulting effluent from said formation through a recovery well.

13. The method of assisting the recovery of petroleum from a petroleum-bearing formation penetrated by at least one injection well and one recovery well comprising adjusting the pressure af a petroleum-bearing formation to a value between about 1600 p.s.i.a. and the critical pressure of a binary nitrogenbutane system at the temperature of said formation, injecting at least 0.25 hydrocarbon pore volume of butane into said formation through an injection well, injecting nitrogen into said formation through an injection well, permitting said nitrogen to contact and to mix with said butane in said formation to establish a two-phase nitrogen and butane region in said formation, continuing to inject nitrogen through an injection well into said formation to move said butane substantially through said formation while maintaining the pressure on said formation between about 1600 p.s.i.a. and the critical pressure of nitrogen and butane at the temperature of said formation and recovering the resulting effluent from said formation through a recovery well.

References Cited by the Examiner

UNITED STATES PATENTS

| 2,669,307 | 2/1954 | Mulholland | 166—9 |
| 2,880,801 | 4/1959 | Crump | 166—9 |
| 2,885,002 | 5/1959 | Jenks | 166—9 |

FOREIGN PATENTS

| 696,524 | 9/1953 | Great Britain. |
| 726,712 | 3/1955 | Great Britain. |

CHARLES E. O'CONNELL, *Primary Examiner.*

UNITED STATES PATENT OFFICE
CERTIFICATE OF CORRECTION

Patent No. 3,231,018                      January 25, 1966

Lyman L. Handy

It is hereby certified that error appears in the above numbered patent requiring correction and that the said Letters Patent should read as corrected below.

Column 3, line 65, for "hydrocargon" read -- hydrocarbon --; column 4, line 1, for "additional of oil about" read -- additional oil above --; same column 4, line 57, for "Zone A" read -- ZONE A --; column 6, line 20, for "produces" read -- products --; same column 6, TABLE 1, third column, line 6 thereof, for "617.4" read -- *617.4 --; column 7, line 47, for "experiment" read -- experiments --; column 8, line 14, for "slovent" read -- solvent --; column 10, line 10, for "$x_s$—mole" read -- $x_s$=mole --; same column 10, lines 17 to 19, the equation should appear as shown below instead of as in the patent:

$$\phi A d1 \left[ \frac{S_L (1-x_s)}{V_{ML}} + \frac{(1-S_L)(1-y_s)}{V_{MB}} - \frac{(1-S_{OD})}{V_{MD}} \right]$$

column 11, line 52, for "ln" read -- in --; column 16, line 67, for "on" read -- of --; column 18, line 29, for "af" read -- of --; line 31, for "nitrogenbutane" read -- nitrogen-butane --; line 33, for "0.25" read -- .025 --.

Signed and sealed this 2nd day of May 1967.

(SEAL)
Attest:

ERNEST W. SWIDER                      EDWARD J. BRENNER
Attesting Officer                     Commissioner of Patents